(12) United States Patent
Cheng

(10) Patent No.: US 6,725,353 B1
(45) Date of Patent: Apr. 20, 2004

(54) INPUT/OUTPUT REGISTER PROGRAMMING SYSTEM AND METHOD

(75) Inventor: Nai-Sheng Cheng, Hsinchu (TW)

(73) Assignee: Via Technologies, Inc., Taipei Hsien (TW)

( * ) Notice: Subject to any disclaimer, the term of this patent is extended or adjusted under 35 U.S.C. 154(b) by 698 days.

(21) Appl. No.: 09/620,869

(22) Filed: Jul. 21, 2000

(30) Foreign Application Priority Data

Apr. 27, 2000 (TW) ........................................ 89107992 A

(51) Int. Cl.[7] .............................................. G06F 12/00
(52) U.S. Cl. ................... 711/220; 711/2; 710/3
(58) Field of Search ........................ 711/220, 2; 710/3, 710/52, 310, 311

(56) References Cited

U.S. PATENT DOCUMENTS 5,500,930 A * 3/1996 Fueki ........................... 345/441
6,023,750 A * 2/2000 Hansen et al. ............... 711/220
6,314,506 B1 * 11/2001 Stanton et al. ............... 711/220

* cited by examiner

Primary Examiner—Mano Padmanabhan
Assistant Examiner—Jasmine Song
(74) Attorney, Agent, or Firm—J.C. Patents

(57) ABSTRACT

An input/output register programming system that uses a set transmission value. The input/output register programming system includes an address decoder, a transmission setting register, a partitioning device, an internal address generator and a transmission space. The address decoder decodes the write address to determine the type of input command. If the input command is a transmission setting register write command, the input data is written down to be used as a set transmission value. The set transmission value determines the target region address of the input command. If the input command is an input/output register write command, the target region address is output. The partitioning device divides the input data into a secondary address and stored data. The internal address generator combines the secondary address with the target region address to produce an internal address. The stored data are transmitted to the registers specified by the internal address.

18 Claims, 3 Drawing Sheets

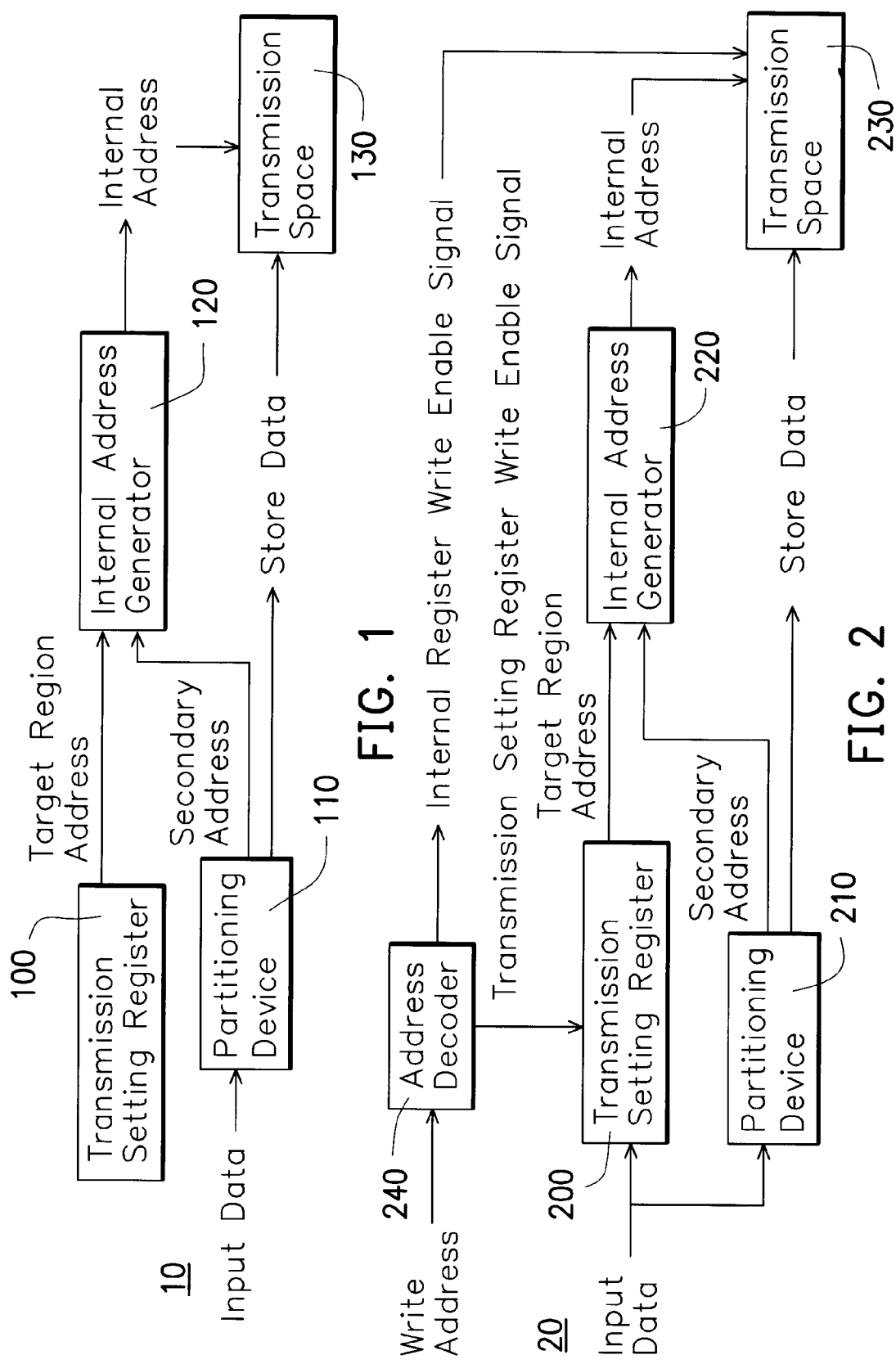

INPUT/OUTPUT REGISTER PROGRAMMING SYSTEM AND METHOD

CROSS-REFERENCE TO RELATED APPLICATION

This application claims the priority benefit of Taiwan application serial no. 89107992, filed Apr. 27, 2000.

BACKGROUND OF THE INVENTION

1. Field of Invention

The present invention relates to an input/output register programming system and method. More particularly, the present invention relates to an input/output register programming system and method that use a set transmission value.

2. Description of Related Art

In most data input/output methods, data reading and writing is achieved through a corresponding input/output register. In fact, most inputs or outputs are carried out in a direct addressing mode. In other words, a fixed address is assigned to all input/output registers so that input/output operations are facilitated. However, when programming a group of input/output registers, the addresses of this group of input/output registers are not serially related to each other. When a non-contiguous register address is encountered during programming, a signal handshaking cycle must be executed. Hence, a lot of time is wasted in handling signal handshaking cycles when addresses of the registers are non-contiguous.

In executing multimedia function calls, since many programming parameters are needed, a large number of registers must be used. Because time needed to process these handshaking signals is correspondingly large, efficiency of multimedia function calls is likely to drop.

SUMMARY OF THE INVENTION

Accordingly, one object of the present invention is to provide a first input/output register programming system that uses a set transmission value. The first input/output register programming system can be applied to any system that uses a write address and an input command for inputting data and a plurality of input/output registers. The first input/output register programming system includes an address decoder, a transmission setting register, a partitioning device, an internal address generator and a transmission space. The address decoder decodes write address to determine if the input command is an input/output register write command or a transmission setting register write command. According to whether the input command is an input/output register write command or a transmission setting register write command, an input/output register write enable signal or a transmission setting register write enable signal is issued. Input data written into the transmission setting register are to become set transmission values when the transmission setting register write enable signal is true. The set transmission value is used for representing the target region address of input command. When the transmission setting register write enable signal is false, the target region address represented by the set transmission value is output. Furthermore, the partitioning device divides the input data into a secondary address and stored data when the transmission setting register write enable signal is false. The internal address generator combines the secondary address and the target region address to produce an internal address. The input/output registers specified by the internal address inside the transmission space are used for storing the stored data.

The invention also provides a second input/output register programming system that uses set transmission values. The second input/output register programming system can be applied to any system that uses a write address and an input command for inputting data and a plurality of input/output registers. The second input/output register programming system includes an address decoder, a transmission setting register, a partitioning device, an internal address generator and a transmission space. The address decoder decodes write address to determine if the input command is an input/output register write command or a transmission setting register write command. Input data is written into the transmission setting register to become a set transmission value when the input command is the transmission setting register write command. The set transmission value is used to determine the target region address of the input command. The target region address represented by the set transmission value is output when the input command is an input/output register write command. Furthermore, the partitioning device divides the input data into a secondary address and stored data. The internal address generator combines the secondary address and the target region address to produce an internal address. The input/output registers specified by the internal address inside the transmission space are used for storing the stored data.

The invention also provides a third input/output register programming system that uses a set transmission value. The third input/output register programming system can be applied to any system that uses a write address and an input command for inputting data and a plurality of input/output registers. The input data includes a secondary address and stored data. The third input/output register programming system includes a transmission setting register, a partitioning device, an internal address generator and a transmission space. The transmission setting register stores a set transmission value for setting the target region address of an input command and is also capable of outputting the target region address. The partitioning device divides the input data into a secondary address and stored data. The internal address generator combines the secondary address and the target region address to produce an internal address. The input/output registers specified by the internal address inside the transmission space are used for storing the stored data.

This invention also provides an input/output register programming method that uses a set transmission value. First, a write address and an input command for inputting data are provided. The input data include a secondary address and stored data. By decoding the write address, whether the input command is an input/output register write command or a transmission setting register write command can be determined. The input data is stored as a set transmission value when the input command is a transmission setting register write command. The target region address represented by the set transmission value is output when the input command is an input/output register write command. The secondary address and the output target region address are combined to produce an internal address. Finally, the stored data are written into the internal address.

This invention also provides an input/output register programming method that uses a set transmission value. First, an input command for inputting data and a target region address is provided. The input data include a secondary address and stored data. By combining the secondary data and the target region address, an internal address is produced. Finally, the stored data are written into the internal address.

In brief, this invention uses a set transmission value and input command that includes a secondary address to produce an internal address. Through address exchange and the setting of transmission values, data in registers having non-contiguous addresses can be accessed as data in registers having contiguous addresses. Therefore, some handshaking cycles between registers are eliminated leading to a faster operating speed for the control system.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings, FIG. 1 is a block diagram showing the connection of an input/output register programming system according to a first preferred embodiment of this invention;

FIG. 2 is a block diagram showing the connection of an input/output register programming system according to a second preferred embodiment of this invention;

DESCRIPTION OF THE PREFERRED EMBODIMENTS

Figure 3:
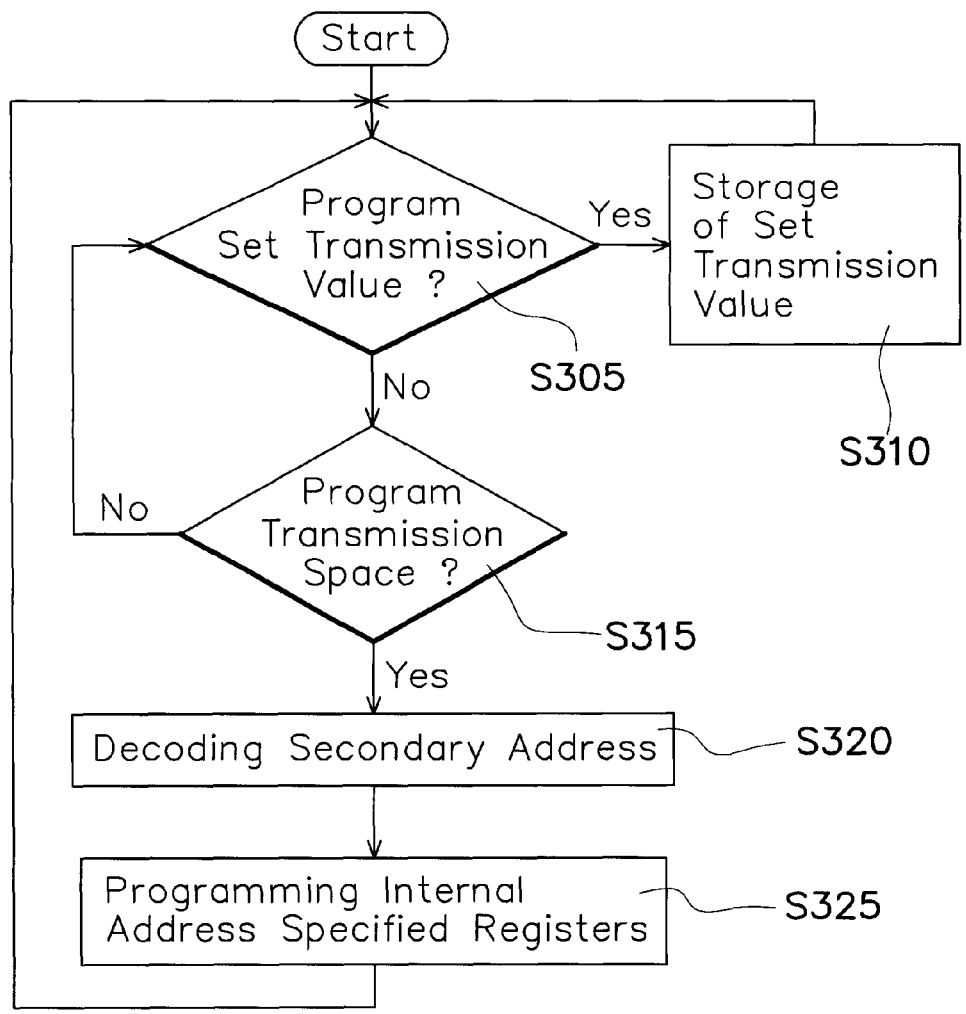
FIG. 3 is a flow chart showing the steps for operating an input/output register programming system according to a third preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram showing the connection of an input/output register programming system according to a first preferred embodiment of this invention. In this embodiment, the input/output register programming system 10 that employs a set transmission value includes a transmission setting (TS) register 100, a partitioning device 110, an internal address generator 120 and a transmission space 130. The embodiment of this invention can be applied to a system having an input command for inputting data and a plurality of input/output registers. The input data includes a secondary address and a data store. The transmission setting register 100 stores the set transmission value for a target region address. Furthermore, the register 100 is capable of redirecting this target region address to the internal address generator 120. The partitioning device 110 is responsible for receiving the input data and then separating the input data into a secondary address and a batch of stored data. Thereafter, by combining the internal address generator 120 with the secondary address and the target region address, an internal address is produced. The transmission space 130 is responsible for receiving the internal address and the stored data, and then storing the data in the input/output register specified by the internal address.

FIG. 2 is a block diagram showing the connection of an input/output register programming system according to a second preferred embodiment of this invention. In the second embodiment, the input/output register programming system 20 includes a transmission setting register 200, a partitioning device 210, an internal address generator 220, a transmission space 230 and an address decoder 240. This type of connection can be applied to a system having a write address, an input command for inputting data and a plurality of input/output registers.

The address decoder 240 decodes the write address and determines if this input command is a write command for the input/output register or a write command for the transmission setting register. When the input command is a write command for the transmission setting register, input data is written into the transmission setting register 200 to become the set transmission value. The set transmission value is used to decide the target region address of the input command. When this input command is the input/output register write command, the transmission setting register 200 will output the target region address as indicated by the set transmission value. In addition, the partitioning device 210 is responsible for separating the input data into a secondary address and storage data. The internal address generator 220 combines the secondary address and the target region address to produce an internal address. Inside the transmission space 230, the data is stored in the input/output register specified by the internal address.

In addition, when the address decoder 240 decodes the write address and notices the input command is the input/output register write command or the transmission setting register write command, the transmission setting register 200 must be notified about the result of decoding before the system can operate normally. There are a number of methods for notifying the transmission setting register 200 of the decoding result. The most common method is to use a signal. As shown in FIG. 2, after a write address is received and decoded, the address decoder 240 will exchange true and false values of different signals according to the type of commands.

In the second embodiment of this invention, if the input command is determined to be an input/output register write command, a true value is put on the input/output register write enable signal line by the address decoder 240 while a false value is put on the transmission setting register write enable signal line. With such settings, input data is prevented from being written into the transmission setting register 200. Instead, the input data is partitioned by the partitioning device, 210 into data sections followed by the execution of a program to determine address and store data. In the meantime, the transmission setting register 200 outputs the target region address of internal storage so that the address determination program can be executed. If the input command is determined to be a transmission setting register write command, a false value is put on the input/output register write enable signal line by the address decoder 240 while a true value is put on the transmission setting register write enable signal line. With such settings, input data will be written into the transmission setting register 200 to become a set transmission value capable of showing the target region address.

For example, if the address of the transmission setting register 200 is 43Ch and the write addresses of the transmission space 230 are the consecutive addresses 440*h*, 444*h* and 448*h*, and the data need to be written in sequence to addresses 0140, 0120 and 0144, the first action is to set the write address to 43Ch. When this write address is decoded by the address decoder 240, a true value is placed on the transmission setting register write enable signal line while a false value is placed on the input/output register enable signal line. Because of this, the input data is written into the transmission setting register 200 to become a set transmission value. Write addresses are subsequently set to 440h, 444h and 448h. When the address decoder 240 decodes these subsequently written write addresses, a false value is placed on the transmission setting register write enable signal line while a true value is placed on the input/output register write enable signal line. With such settings, input data is not transmitted into the transmission setting register 200. Instead, the input data is divided into secondary address and stored data by the partitioning device 210. The secondary address and target region address from the transmission setting register 200 are combined inside the internal address generator 220 to obtain the addresses 0140, 0120 and 0144. Finally, stored data is sequentially stored in the input/output registers corresponding to addresses.

Note that due to a difference in set transmission values, correspondence relationships between the write address and the actual input/output register address are different. Hence, the correspondence relationship used in this invention is a simplified version for illustration only and should not be regarded as a limitation of the correspondence relationship between write address and input/output register address in general. In addition, the proposed signal setting method is only one among all the signaling methods. Other signaling methods may also be employed as long as the input/output register programming system 20 can operate normally. Therefore, actual applications are not limited by the use of these two types of enable signals.

FIG. 3 is a flow chart showing the steps for operating an input/output register programming system according to a third preferred embodiment of this invention. In the third embodiment of the invention, the need for programming transmission setting is determined in step S305 after starting the system. If transmission setting is required, the set values needed for programming are stored in step S310. On the other hand, if there is no need for programming transmission settings, step S315 is executed. In step S315, the need for programming transmission space is assessed. If no programming of transmission space is required, control is returned to step S305. On the contrary, if programming of transmission space is desired, control is continued in step S320. In step S320, secondary address is decoded. In step 325, according to the internal address derived from the secondary address and the target region address within the set transmission values, the input/output registers specified by the internal addresses are programmed.

In addition, a preset value can be written immediately upon starting the system. In step S305, when programming of transmission settings is not needed, an inspection aimed at the values of transmission settings can still be executed. In other words, when the programming of transmission settings is not executed, the transmission settings can be checked to see if there is any previous setting. If there is none, a setting step must be executed before step S315 can be initiated.

Figure 4:
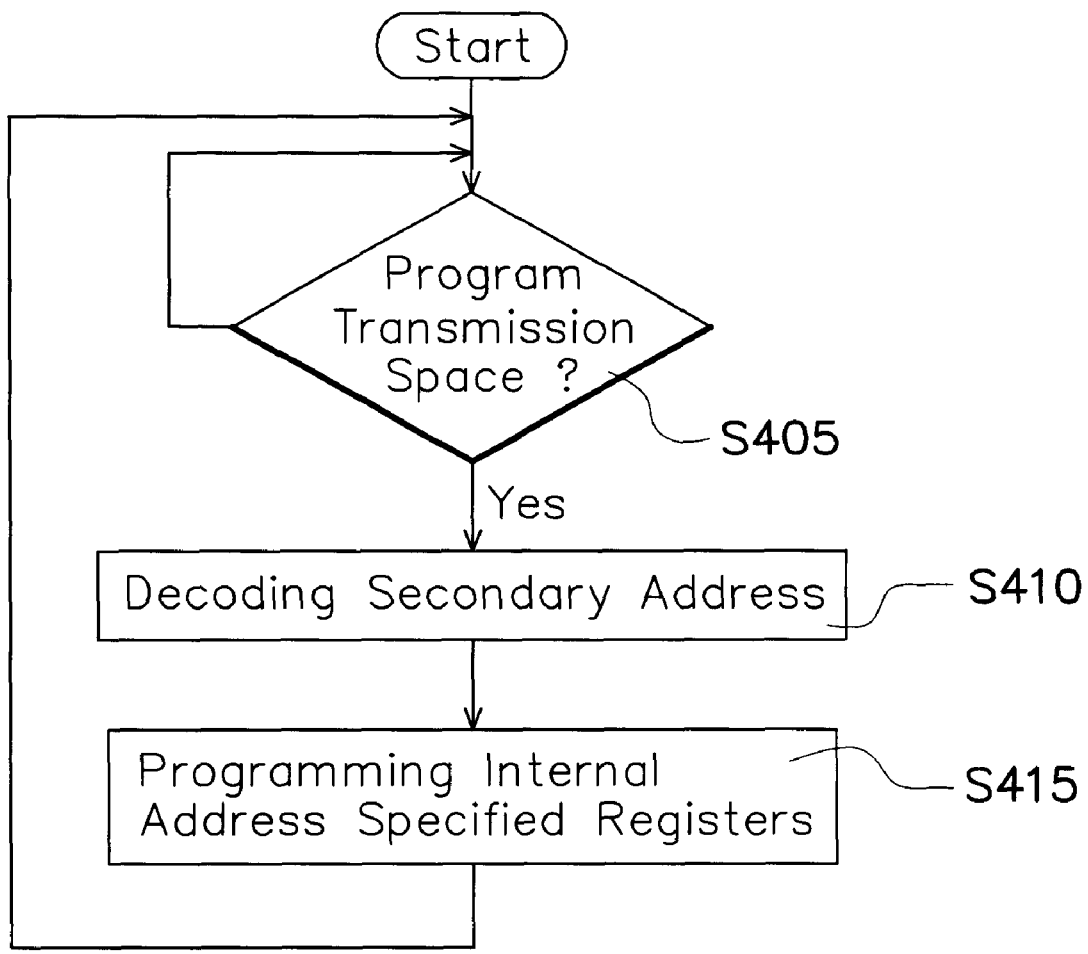
FIG. 4 is a flow chart showing the steps for operating an input/output register programming system according to a fourth preferred embodiment of this invention.

FIG. 4 is a flow chart showing the steps for operating an input/output register programming system according to a fourth preferred embodiment of this invention. In the fourth embodiment of this invention, the values for transmission are set immediately after the system is initiated. Hence, one only has to perform an inspection to determine if programming of the transmission space is required in step S405. If programming of the transmission space is required, step 410 is executed to decode the secondary address. The secondary address and the target region address included in the set transmission values are combined to obtain an internal address. Finally, in step S415, the input/output register specified by the internal address is programmed.

Note that the input/output register mentioned in this invention can be any type of input/output device. For example, the input/output register can be an image display port, an external memory unit, a magnetic disk and so on.

In summary, the invention has several advantages. Through address exchange and the setting of transmission values, data in registers having non-contiguous addresses can be accessed as data in registers having contiguous addresses. Therefore, some handshaking cycles between registers are eliminated leading to a faster operating speed for the control system.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An input/output register programming system that uses a set transmission value and is suitable for a system having a write address and an input command for inputting data and a plurality of input/output registers, comprising:

an address decoder for decoding the write address to determine if the input command is an input/output register write command or a transmission setting (TS) register write command and issue an input/output register write enable signal or TS register write enable signal accordingly;

a TS register for importing input data to become the set transmission value when the TS register write enable signal is true, wherein the set transmission value are used to represent the target region address of the input command, and the target region address is output when the TS register write enable signal is false;

a partitioning device dividing the input data into an auxiliary address and a stored data when the TS register write enable signal is false;

an internal address generator for combining the auxiliay address and the target region address to produce an internal address; and a transmission space for data storage, wherein the transmission space includes the input/output registers specified by the internal address.

2. An input/output register programming system that uses a set transmission value and is suitable for any system having a write address and an input command for inputting data and a plurality of input/output registers, comprising:

an address decoder for decoding the write address to determine if the input command is an input/output register write command or a transmission setting (TS) register write command;

a TS register for importing input data to become the set transmission value when the input command is a TS register write command, wherein the set transmission value are used to represent the target region address of the input command and the target region address is output when the input command is an input/output register write command;

a partitioning device dividing the input data into an auxiliary address and a stored data;

an Internet address generator for combining the auxiliary address and the target region address to produce an internal address; and a transmission space for data storage, wherein the transmission space includes the input/output registers specified by the internal address.

3. The system of claim 2, wherein after the decoder has determined whether the input command is the input/output register write command or the TS register write command, a corresponding input/output register write enable signal or a corresponding TS register write enable signal is issued.

4. The system of claim 3, wherein the input command is imported into the TS register when the TS register write enable signal is true.

5. The system of claim 3, wherein the target region address representing the set transmission value is issued when the TS register write enable signal is false.

6. An input/output register programming system that uses a set transmission value and is suitable for any system having a write address and an input command for inputting data and a plurality of input/output registers, comprising:

a TS register for storing a set transmission value capable of determining the target region address of an input command and outputting the target region address;

a partitioning device dividing the input data into an auxiliary address and stored data;

an internal address generator for combining the auxiliary address and the target region address to produce an internal address; and a transmission space for data storage, wherein the transmission space includes the input/output registers specified by the internal address.

7. An input/output register programming method that uses a set transmission value, comprising the steps of:

providing a write address and an input command containing input data, wherein the input data includes an auxiliary address and a stored data;

decoding the write address to determine if the input command is an input/output register write command or a TS register write command;

storing the input data to become a set transmission value when the input command is a TS register write command;

outputting the target region address representing the set transmission value when the input command is an input/output register write command;

combining the auxillary address and the target region address to produce an internal address; and writing the stored data into the internal address.

8. The method of claim 7, wherein after the step of determining the input command to be the input/output register write command or the TS register write command, further includes issuing a corresponding input/output register write enable signal or a corresponding TS register write enable signal.

9. The method of claim 8, wherein the input data is stored up to be used as a set transmission value when the TS register write enable signal is true.

10. The method of claim 8, wherein the target region address is output when the TS register write enable signal is false.

11. An input/output register programming method that uses a set transmission value, comprising the steps of:

providing an input command containing input data, wherein the input data includes an auxiliary address and a stored data;

providing a target region address;

combining the auxillary address and the target region address to produce an internal address; and writing the stored data into the internal address.

12. The method of claim 11, wherein the input command further includes a write address.

13. The method of claim 12, wherein the method further include decoding the write address to determine if the input command is an input/output register write command or a TS register write command.

14. The method of claim 13, wherein the input data is stored to be used as a set transmission value when the input command is a TS register write command, with the set transmission value containing a target region address.

15. The method of claim 13, wherein the target region address is output when the input command is an input/output register write command.

16. The method of claim 13, wherein the method further includes the sub-steps of:

transmitting an input/output register write enable signal when the input command is an input/output register write command; and transmitting a TS register write enable signal when the input command is a TS register write command.

17. The method of claim 16, wherein the input data is stored to be used as a set transmission value when the TS register write enable signal is true, with the set transmission value containing a target region address.

18. The method of claim 16, wherein the target region address is output when the TS register write enable signal is false.

* * * * *